United States Patent
Khatib et al.

(10) Patent No.: US 7,211,979 B2
(45) Date of Patent: May 1, 2007

(54) TORQUE-POSITION TRANSFORMER FOR TASK CONTROL OF POSITION CONTROLLED ROBOTS

(75) Inventors: Oussama Khatib, Stanford, CA (US); Peter Thaulad, Santa Clara, CA (US); Jaehoung Park, Palo Alto, CA (US)

(73) Assignee: The Broad of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/404,050

(22) Filed: Apr. 13, 2006

(65) Prior Publication Data

US 2006/0250101 A1    Nov. 9, 2006

Related U.S. Application Data

(60) Provisional application No. 60/671,405, filed on Apr. 13, 2005.

(51) Int. Cl.
*B25J 9/18* (2006.01)

(52) U.S. Cl. .............................. 318/568.11; 318/568.12; 318/568.22; 318/632; 700/245; 700/257; 700/261; 700/262

(58) Field of Classification Search ........... 318/568.11, 318/568.12, 568.22, 632; 700/245, 257, 700/261, 262
See application file for complete search history.

(56) References Cited

U.S. PATENT DOCUMENTS

| | | | |
|---|---|---|---|
| 4,603,284 A * | 7/1986 | Perzley | 318/568.14 |
| 4,925,312 A | 5/1990 | Onaga et al. | 364/513 |
| 4,943,759 A * | 7/1990 | Sakamoto et al. | 700/261 |
| 4,985,668 A * | 1/1991 | Nakazumi et al. | 318/568.2 |
| 5,239,246 A | 8/1993 | Kim | 318/568 |
| 5,418,440 A * | 5/1995 | Sakaguchi et al. | 318/560 |
| 5,742,138 A | 4/1998 | Kato et al. | 318/568.18 |
| 5,834,917 A | 11/1998 | Yasui et al. | 318/568.11 |
| 5,994,864 A | 11/1999 | Inoue et al. | 318/568.2 |
| 2004/0128030 A1 | 7/2004 | Nagata et al. | 700/245 |

* cited by examiner

*Primary Examiner*—Rina Duda
(74) *Attorney, Agent, or Firm*—Lumen Intellectual Property Services, Inc.

(57) ABSTRACT

Torque control capability is provided to a position controlled robot by calculating joint position inputs from transformation of the desired joint torques. This is based on calculating the transfer function $1/E(s)$, which relates the desired joint torque to joint position. Here $E(s)$ is a servo transfer function $D(s)$ or an effective servo transfer function $D^*(s)$. The use of an effective servo transfer function $D^*(s)$ is helpful in cases where joint nonlinearities are significant. The effective servo transfer function $D^*(s)$ is defined with respect to an ideal joint transfer function $G^*(s)=1/(I_{eff}s^2+b_{eff}s)$, where $I_{eff}$ is an effective moment of inertia and $b_{eff}$ is an effective damping coefficient.

11 Claims, 4 Drawing Sheets

TORQUE-POSITION TRANSFORMER FOR TASK CONTROL OF POSITION CONTROLLED ROBOTS

CROSS REFERENCE TO RELATED APPLICATIONS

This application claims the benefit of U.S. provisional application 60/671,405, filed on Apr. 13, 2005, entitled "Torque-Position Transformer for Task Control of Position Controlled Robots", and hereby incorporated by reference in its entirety.

FIELD OF THE INVENTION

This invention relates to control of robots.

BACKGROUND

Robots are multi-body systems whose dynamics is nonlinear and highly coupled. Robotic control is most frequently accomplished with a position control system. This position control is realized at the joint level, where each joint is treated independently and coupled dynamic effects between joints are ignored. A typical position controller at each joint is implemented using PID control with high gains. Since this position controller cannot account for the dynamics of the system, the dynamic coupling effects are treated as a disturbance. This limits the performance that can be achieved by the system in the case of high speed precise trajectory tracking and compliant motion.

One approach for addressing this problem is to provide a torque controlled robot. The input torques for this system can be designed to accomplish the robot desired task as well as to compensate for nonlinear dynamic coupling of the system. This provides the robot with higher performance in position tracking as well as in compliant motion. Although torque controlled robots are preferred to achieve high performance control, most robots have embedded position control.

Since providing direct torque control for robots tends to be difficult, methods to improve the performance of position controlled robots have been investigated. For example, U.S. Pat. No. 5,834,917 considers a robot having a disturbance detector which detects a disturbance torque, where the disturbance torque is used to correct a position input. U.S. Pat. No. 5,742,138 considers a method for "floating" a robot by compensating for static external forces (e.g., gravity). Improved control of a position controlled robot is also considered in US 2004/0128030.

It would be an advance in the art to provide improved control of position controlled robots to more closely approach the desirable performance provided by closed loop control of both position and torque. In particular, it would be an advance to provide dynamic (i.e., time varying) torque control of a position-controlled robot.

SUMMARY

Torque control capability is provided to a position controlled robot by calculating joint position inputs from transformation of the desired joint torques. This is based on calculating the transfer function 1/E(s), which relates the desired input torque to joint position. Here E(s) is a servo transfer function D(s) or an effective servo transfer function D*(s). The use of an effective servo transfer function D*(s) is helpful in cases where joint nonlinearities are significant. The effective servo transfer function D*(s) is defined with respect to an ideal joint transfer function $G^*(s)=1/(I_{eff}s^2 + b_{eff}s)$, where $I_{eff}$ is an effective moment of inertia and $b_{eff}$ is an effective damping coefficient.

DETAILED DESCRIPTION

Figure 1:
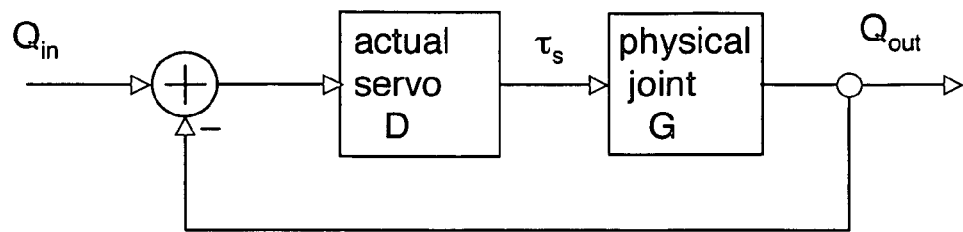
FIG. 1 shows a block diagram of a first embodiment of the invention.

FIG. 1 shows a block diagram of a feedback servo loop for control of a position controlled robot. In this description, "position controlled robot" refers to a robot having closed loop position control, but incapable of having true closed loop torque control (e.g., if the robot has no force/torque sensors to provide torque/force feedback signals). Here a joint of the robot is regarded as a motor-gear-link system. The input joint torque command $\tau_s$ to output joint position $Q_{out}$ relationship is denoted by G. A servo controller D is placed before the joint, which is typically designed to compensate for the linear dynamics of the joint as well as to address any nonlinear effects that may be associated with the joint. As shown on FIG. 1, a negative feedback loop is closed around the series combination of D and G and acts to drive the position error $Q_{in}-Q_{out}$ to zero.

The full dynamics of the joint (i.e., G) is given by:

$$I_{eff}\frac{d^2 Q_{out}}{dt^2} + b_{eff}\frac{dQ_{out}}{dt} + n\left(Q_{out}, \frac{dQ_{out}}{dt}\right) = \tau_s, \quad (1)$$

where $I_{eff}$ is the effective moment of inertia seen at the joint output and $b_{eff}$ is the effective linear friction coefficient at the joint output. These effective values combine the properties of both the motor and the link and gear ratio and are calculated by using the mechanical properties of the system. The n $(Q_{out}, dQ_{out}/dt)$ term captures the nonlinear effects that may be present in the joint dynamics.

The relationship between the commanded input position $Q_{in}$ and resulting position $Q_{out}$ in the feedback controller of FIG. 1 can be represented by a closed loop transfer function $T(s)=Q_{out}(s)/Q_{in}(s)$.

In cases where nonlinear effects at the joint are negligible, it is sufficient, in terms of model accuracy, to represent D and G as linear transfer functions D(s) and G(s). The input joint torque command $\tau_s(s)$ is then given by $$\tau_s(s)=D(s)(Q_{in}(s)-Q_{out}(s))=D(s)Q_{in}(s)(1-T(s)). \quad (2)$$

From Eq. 2, we can determine the position input $Q_{in}(s)$ corresponding to a desired dynamic torque $\tau_{des}(s)$ as follows:

$$Q_{in}(s) = \frac{\tau_{des}(s)}{D(s)} + Q_{out}(s) = \frac{\tau_{des}(s)}{D(s)(1-T(s))}. \quad (3)$$

Eq. 3 provides one of the key results of the invention, since it shows how a dynamic position input $Q_{in}(s)$ corresponds to a desired dynamic torque $\tau_{des}(S)$ for a position controlled robot. Here and throughout this description, "dynamic" means time-varying, and specifically excludes the static case where a torque substantially has a constant value independent of time. Dynamic torques in this sense can arise from a force (e.g., gravity) acting on a moving object (e.g., moving robot parts).

In cases where nonlinear effects cannot be neglected, the torque to position transformation is provided according to another embodiment of the invention. Because of the non-linear effects, the effective torque at the joint $\tau_{eff}$ differs from the torque $\tau_s$ at the output of the controller D. This torque $\tau_{eff}$ is precisely the torque that we are interested in controlling. In that case, T(s) cannot be computed analytically because of the nonlinear nature of the joint. However, it can be experimentally identified from frequency analysis of the response of the closed loop system.

The torque $\tau_{eff}$ can be viewed as the torque associated with the linear portion of the dynamic system described in Eq. 1, which can be represented by a transfer function of an ideal system:

$$G^*(s) = \frac{1}{I_{eff}s^2 + b_{eff}s}. \quad (4)$$

Figure 2:
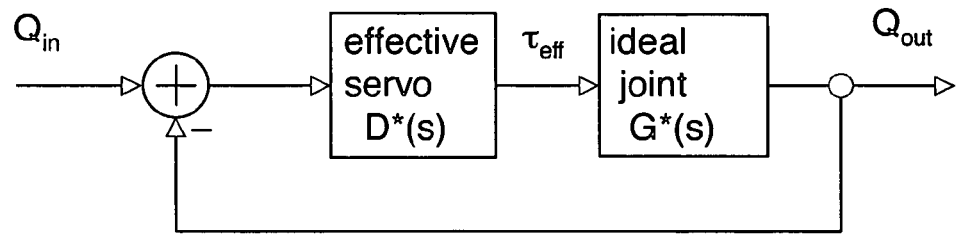
FIG. 2 shows a block diagram of a second embodiment of the invention.

Given the identified closed loop transfer function T(s) and the ideal system model G*(s), the effective controller, as illustrated in FIG. 2, can be computed as:

$$D^*(s) = \frac{T(s)}{G^*(s) - T(s)G^*(s)} \quad (5)$$

D*(s) provides the relationship between the torque $\tau_{eff}$ and the position error $(Q_{in} - Q_{out})$:

$$\tau_{eff} = D^*(s))Q_{in} - Q_{out}) \quad (6)$$

In order to produce a desired torque $\tau_{des}$ on the joint, the position input $Q_{in}$ is set to:

$$Q_{in} = \frac{\tau_{des}}{D^*(s)} + Q_{out} = \frac{\tau_{des}}{D^*(s)(1-T(s))}. \quad (7)$$

The transfer function D*(s) provides control of the effective torque of the joint that is controlled by a position based servo-loop.

In general terms, the preceding approaches can be regarded as including the following steps: 1) determining a closed loop position transfer function T(s) of a selected joint of the robot relating a commanded input joint position $Q_{in}(s)$ to an actual joint position $Q_{out}(s)$ via $Q_{out}(s)=T(s)Q_{in}(s)$; 2) selecting a dynamic open loop joint torque to position transfer function H(s) relating to the selected joint; 3) determining a corresponding effective servo transfer function E(s) of the selected joint according to $E(s)=T(s)/(H(s)-T(s)H(s))$; 4) providing a desired dynamic torque $\tau_{des}(S)$ of the selected joint; and 5) determining $Q_{in}(s)$ of the selected joint corresponding to $\tau_{des}(s)$ via $Q_{in}(s)=\tau_{des}(s)/(E(s)(1-T(s))$. In this framework, the approach of FIG. 1 (and Eq. 3) corresponds to selecting H(s) to be the physical joint transfer function G(s), and the corresponding servo E(s)=D(s). Similarly, the approach of FIG. 2 (and Eq. 7) corresponds to selecting H(s) to be the idealized joint transfer function G*(s) given by Eq. 4, and the corresponding servo E(s)=D*(s). Thus there are various ways H(s) can relate to the selected joint.

Figure 4:
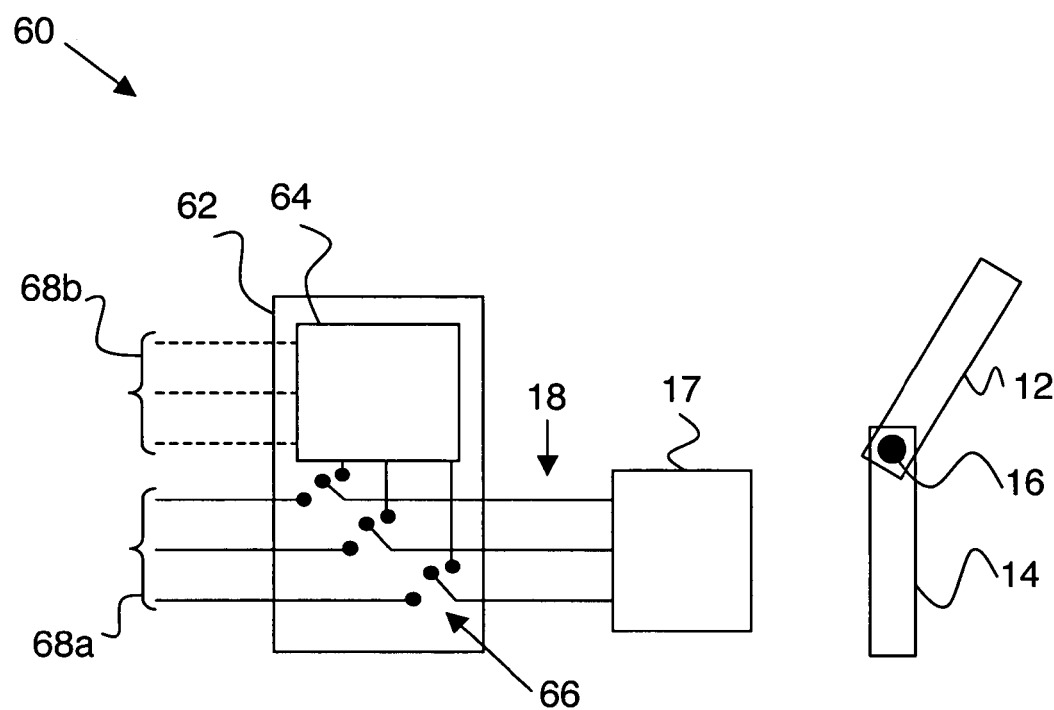
FIG. 4 shows an embodiment of the invention.

FIG. 4 shows an embodiment of the invention. A robotic system 60 includes a position controlled robot having two or more members (12, 14) connected by one or more joints 16. A position controller 17 accepts robot control inputs 18 and commands the robot to move accordingly (via connections and actuators which are conventional, and are therefore not shown). Robot control inputs 18 are position inputs and do not include torque inputs. Thus the combination of elements 12, 14, 16, and 17 acts as a conventional position controlled robot, and is not capable of accepting control inputs relating directly to torques at its joints.

Figure 3:
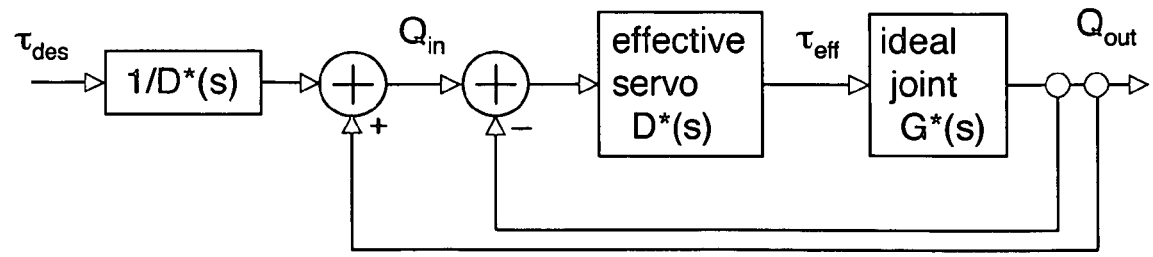
FIG. 3 shows an enlarged block diagram of the second embodiment of the invention.

Robotic system 60 includes a processor 62 having processor control inputs 68a and 68b. One or more of the processor control inputs are torque inputs relating to torques at one or more selected joints of the robot. In this example, processor control inputs 68b are torque inputs, and are shown with dashed lines. Processor 62 includes a torque to position converter 64 for converting torque inputs 68b to corresponding position-based robot control inputs 18 (e.g., as on FIG. 3). As shown on FIG. 4, position inputs 68a can alternatively be provided to processor 62, thus using the controller without taking advantage of the torque transformer. The robot control inputs 18 can then be selected from position inputs 68a or from position inputs derived from torque inputs 68b by torque to position converter 62. Switches 66 provide this selection capability. Torque to position conversion according to the invention can be applied at one or more joints of the robot, and can be applied to all or some of the degrees of freedom of each selected joint. Thus, the quantities Q, D, G, H, etc. in the preceding description can be regarded as either scalar quantities (if only one degree of freedom is relevant) or vector/matrix quantities (if two or more degrees of freedom are relevant).

Torque to position conversion according to the invention is based on inversion of a dynamical model of the position controlled robot, as described above in connection with FIGS. 1–3. Such inversion can transform a torque input to a corresponding position input that will tend to result in an actual torque at the robot that is a good approximation of the initial torque input. Torque to position conversion can be provided by any combination of hardware and/or software, although software implementation is often preferred for flexibility and ease of modification.

Figure 5:
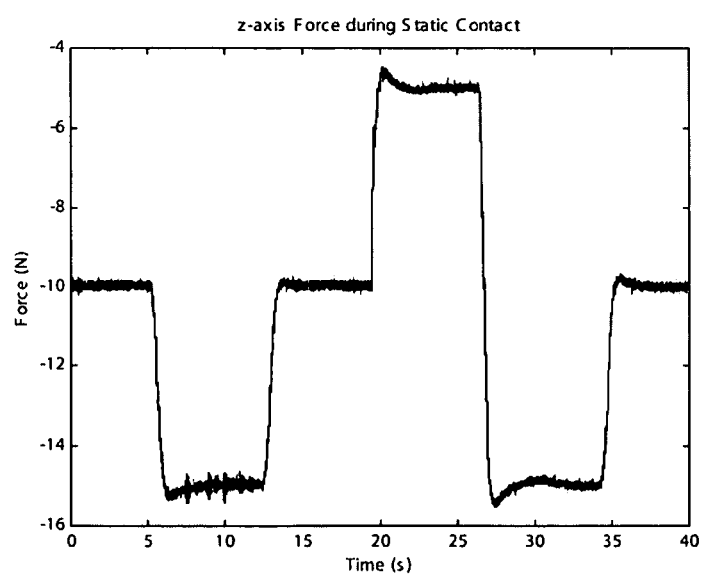
FIG. 5 shows measured results from a first example of the invention.

Torque to position conversion for robot control according to the invention has been experimentally investigated, with good results. For example, FIG. 5 shows measured contact forces for a robot controlled according to the embodiment of FIG. 2 (i.e., an idealized joint transfer function G*(s) was employed to derive the position inputs corresponding to desired torques). In this example, input torque commands were set to generate a 10 N contact force with +/−5 N steps.

A minor overshoot at each transition, consistent with slightly underdamped behavior, is seen.

Figure 6:
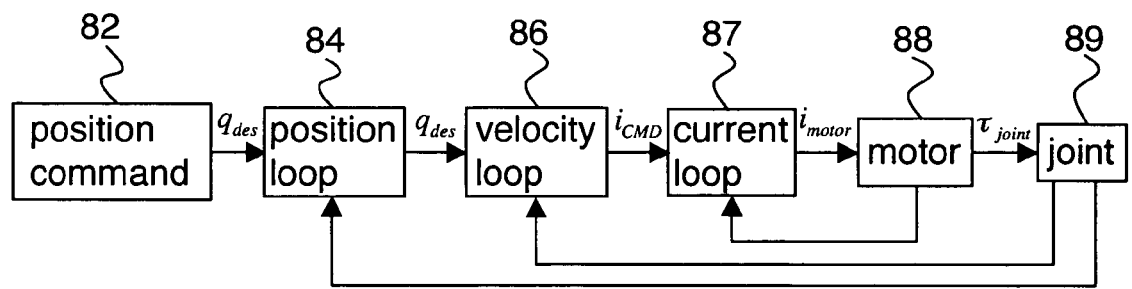
FIG. 6 shows a block diagram relating to a second example of the invention.

FIG. 6 shows an example of position control of a robot. A position command 82 is provided as an input to a position loop 84. The outer position loop 84 includes a nested current loop 87 within a velocity loop 86. Current loop 87 drives a motor 88 which drives a joint 89.

Figure 7A:
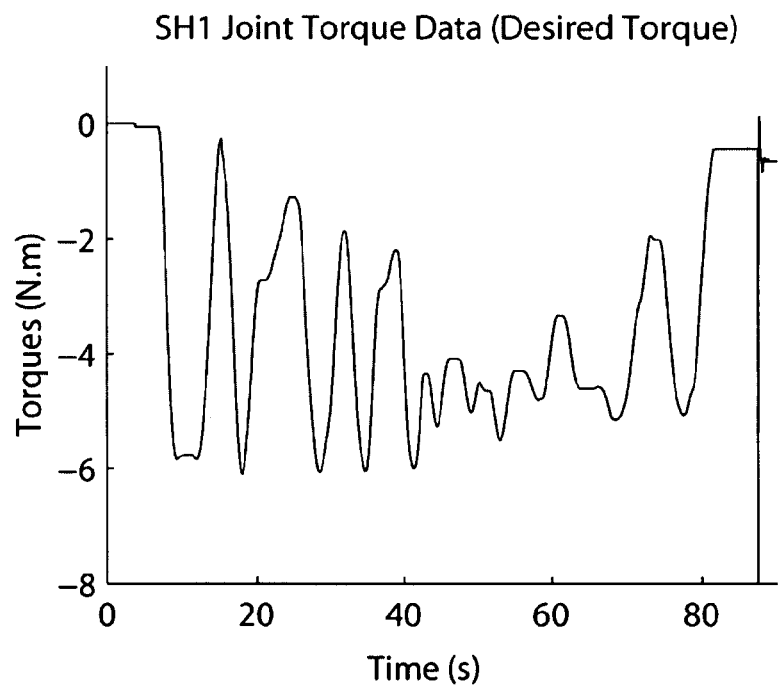
FIGS. 7a–b show measured results from a second example of the invention.
Figure 7B:
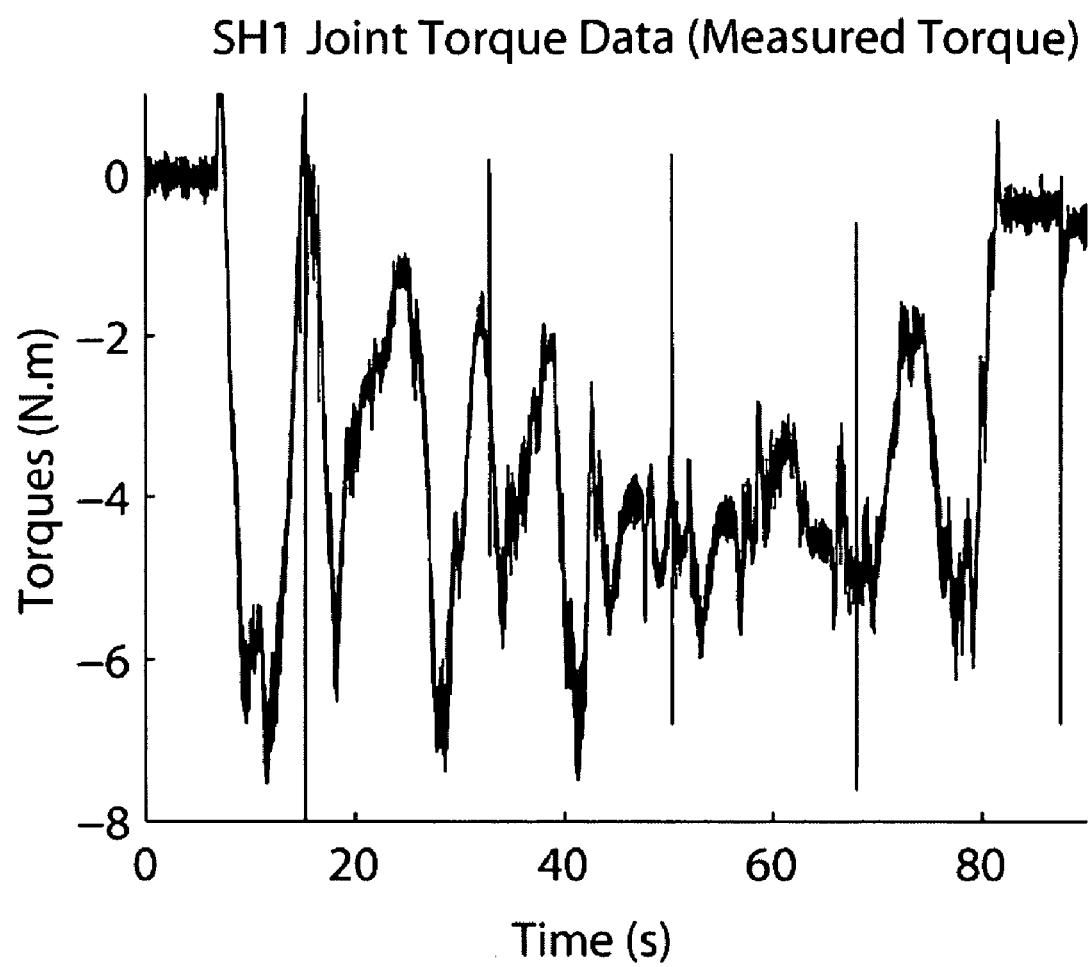

FIGS. 7a–b show desired torque (FIG. 7a) and measured torque (FIG. 7b) from an embodiment of the invention where a position controlled robot having the block diagram of FIG. 6 is provided with torque control according to the embodiment of FIG. 1 (i.e., the physical joint transfer function G(s) was employed to derive the position inputs corresponding to desired torques). The measured torque of FIG. 7b tracks the desired torque of FIG. 7a well. In this example, the dynamic torques are gravitational torques on a moving robot arm.

The invention claimed is:

1. A robotic control method for a position controlled robot, the method comprising:
   a) determining a closed loop position transfer function T(s) of a selected joint of the robot relating a commanded input joint position $Q_{in}(s)$ to an actual joint position $Q_{out}(s)$ via $Q_{out}(s)=T(s)Q_{in}(s)$;
   b) selecting a dynamic open loop joint torque to position transfer function H(s) relating to the selected joint;
   c) determining a corresponding effective servo transfer function E(s) of the selected joint according to $E(s)=T(s)/(H(s)-T(s)H(s))$;
   d) providing a desired dynamic torque $\tau_{des}(s)$ of the selected joint; and
   e) determining $Q_{in}(s)$ of the selected joint corresponding to $\tau_{des}(s)$ via $Q_{in}(s)=\tau_{des}(s)/(E(s)(1-T(s)))$.

2. The method of claim 1, wherein said transfer function H(s) is a physical transfer function of said selected joint.

3. The method of claim 1, wherein said transfer function H(s) is an idealized transfer function of said selected joint.

4. The method of claim 3, wherein H(s) is given by $H(s)=1/(I_{eff}s^2+b_{eff}s)$, where $I_{eff}$ is an effective moment of inertia of said selected joint, and $b_{eff}$ is an effective damping coefficient of said selected joint.

5. The method of claim 4, wherein said transfer function H(s) differs substantially from a physical transfer function G(s) of said selected joint.

6. A robotic control method for a position controlled robot, the method comprising:
   selecting two or more joints of the robot; and
   providing desired torque inputs to each of the selected joints as corresponding position inputs according to the method of claim 1.

7. A robotic control system comprising:
   a) a position controlled robot having a closed loop position transfer function T(s) of a selected joint of the robot relating a commanded input joint position $Q_{in}(s)$ to an actual joint position $Q_{out}(s)$ via $Q_{out}(s)=T(s)Q_{in}(s)$;
   b) a processor including a torque to position converter, wherein said torque to position converter is capable of providing $Q_{in}(s)$ corresponding to a desired dynamic torque $\tau_{des}(s)$ of the selected joint according to a method comprising:
   selecting a dynamic open loop joint torque to position transfer function H(s) relating to the selected joint;
   determining a corresponding effective servo transfer function E(s) of the selected joint according to $E(s)=T(s)/(H(s)-T(s)H(s))$; and
   determining $Q_{in}(s)$ of the selected joint corresponding to $\tau_{des}(s)$ via $Q_{in}(s)=\tau_{des}(s)/(E(s)(1-T(s)))$.

8. The system of claim 7, wherein said transfer function H(s) is a physical transfer function of said selected joint.

9. The system of claim 7, wherein said transfer function H(s) is an idealized transfer function of said selected joint.

10. The system of claim 9, wherein H(s) is given by $H(s)=1/(I_{eff}s^2+b_{eff}s)$, where $I_{eff}$ is an effective moment of inertia of said selected joint, and $b_{eff}$ is an effective damping coefficient of said selected joint.

11. The system of claim 10, wherein said transfer function H(s) differs substantially from a physical transfer function G(s) of said selected joint.

* * * * *